Figure 1:
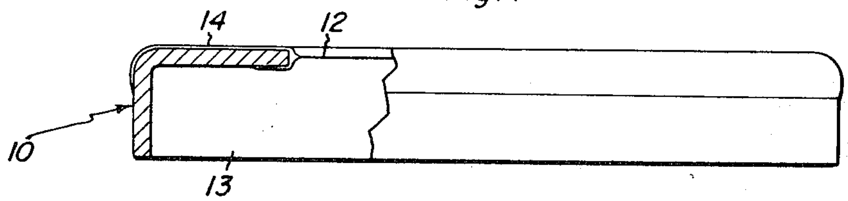

Oct. 13, 1970

R. C. ANDERSON ETAL 3,534,209

IMAGE ORTHICON TARGET ASSEMBLY AND SEALING GLASS COMPOSITION THEREFOR

Original Filed Jan. 2, 1964

Inventors:
Richard C. Anderson;
Matthew J. Curran,
by [signature]
Their Attorney 3,534,209
Patented Oct. 13, 1970

3,534,209

IMAGE ORTHICON TARGET ASSEMBLY AND SEALING GLASS COMPOSITION THEREFOR

Richard C. Anderson and Matthew J. Curran, Schenectady, N.Y., assignors to General Electric Company, a corporation of New York

Original application Jan. 2, 1964, Ser. No. 335,152, now Patent No. 3,294,508, dated Dec. 27, 1966. Divided and this application Sept. 26, 1966, Ser. No. 582,068
Int. Cl. C03c *5/00, 27/04;* H01j *29/10*
U.S. Cl. 313—89 2 Claims

This is a division of our copending application Ser. No. 335,152, filed Jan. 2, 1964 (now Pat. No. 3,294,508 granted Dec. 27, 1966) and assigned to the assignee hereof.

The present invention relates generally to the art of joining glass and metal parts together and is more particularly concerned with a novel sealing glass composition and with a new semiconducting, glass-bonded, metal article incorporating this new glass as the sealing element.

In the manufacture of image orthicon targets, it is and has for some time been standard practice to use a soda lime glass as the target element and to provide a supporting ring of metal and to seal these two parts together. A lead glass having thermal expansion characteristics complementing those of the soda lime glass target and the supporting ring is used to make the seal. Efforts to carry over this technique to other target glass materials such as semiconducting glasses of the type disclosed and claimed in U.S. Pat. 3,258,434, granted June 28, 1966, have not been successful. Thus, the lead glass does not wet these semiconducting glasses sufficiently to form a good seal, resulting in breakage during processing of the target assembly. Furthermore, the linear thermal expansion (or contraction) of semiconducting glasses, particularly borate glasses, is such that the lead glass is no longer complementary in this characteristic and there also is an inordinately large difference between the thermal linear expansion of the metal supporting rings commonly used in the manufacture of these image orthicon targets and semiconducting glasses.

For the first time to our knowledge, it is now possible by virtue of this invention to make an image orthicon target incorporating a semiconducting glass target element which will have consistently good operating characteristics and will be useful over uniquely prolonged periods. This result is attributable to the novel composition of this invention and to the unique combination including this composition, and further to the new process employing this composition in the production of this new target assembly.

The new sealing glass of our invention owes to its chemical composition its novel properties and characteristics rendering it of special value for sealing semiconducting glass target elements. Broadly defined, this sealing glass consists essentially of between 10 and 25 parts of barium oxide, between 15 and 30 parts of boron oxide, between 25 and 40 parts of vanadium pentoxide and between 25 and 40 parts of zinc oxide. Within these compositional limits, there are a number of glasses which are especially preferred for use in the manufacture of these target elements. It will be understood, however, that while in some cases glasses within the limits broadly defined above can be used for this purpose, their properties are not such that they would be preferred to other members of this glass family. In those cases, the principal utility may lie in other sealing applications.

A glass composition which is especially suited for use with calcium borate semiconducting glasses and with nickel-iron alloy target support rings contains 20 percent barium oxide, 15 percent boron oxide, 35 percent vanadium pentoxide and 30 percent zinc oxide. Another such preferred sealing glass consists of 15 percent barium oxide, 20 percent boron oxide, 35 percent vanadium pentoxide and 30 percent zinc oxide.

The composite articles of this invention, as represented by image orthicontargets, comprise three elements, namely a nickel-iron support ring, a glass membrane disposed over and closing the ring and a sealing glass bonding the ring and glass membrane together. The glass membrane of this assembly has a thermal linear expansion approximating that of the ring over a relatively broad temperature range and the sealing glass has a lower softening-point temperature than the glass membrane and has a thermal linear contraction not exceeding that of the metal ring by more than 0.0005 inch per inch per degree centigrade upon cooling the seal. Preferably, the sealing glass is one of composition within the limits defined above and also preferably the sealing glass is in the form of an annular fillet disposed between the glass membrane and the supporting ring, bonding these two parts together around their entire circumferences. Further, the sealing glass necessarily has a softening-point temperature at least 120° C. below the softening point temperature of the glass of the said membrane. Depending upon the particular sealing glass and semiconducting glass employed, the support ring may be of an alloy of from 42 percent to 48 percent nickel, balance iron.

In its method aspect, our present invention involves the use of the present novel sealing glasses in the production of the novel composite glass-metal articles, specifically image orthicon targets, described above. Accordingly, in brief description, this method comprises the steps of coating a target support metal ring with a layer of sealing glass frit, placing a membrane of semiconducting glass over the ring in contact with the frit, heating this assembly, sagging the membrane over the ring and simultaneously forming a sealing glass fillet between the ring and membrane, and finally, cooling the resulting sealed assembly to solidify the sealing glass in sealing contact with the ring and membrane. Once again, the sealing glass employed consists essentially of barium oxide, boron oxide, vanadium pentoxide and zinc oxide within the compositional limits generally described above. Also preferably, the glass membrane is of semiconducting calcium borate glass and the support ring is of nickel-iron alloy of 46 percent nickel and 64 percent iron.

Figure 2:
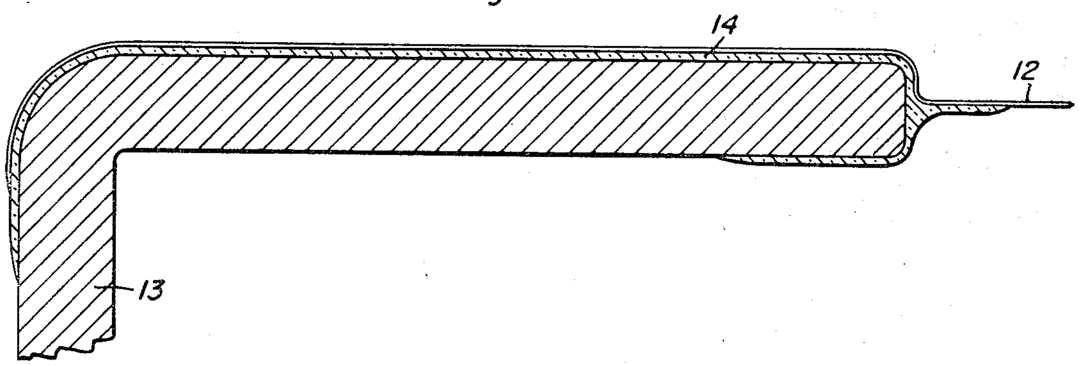
Figure 3:
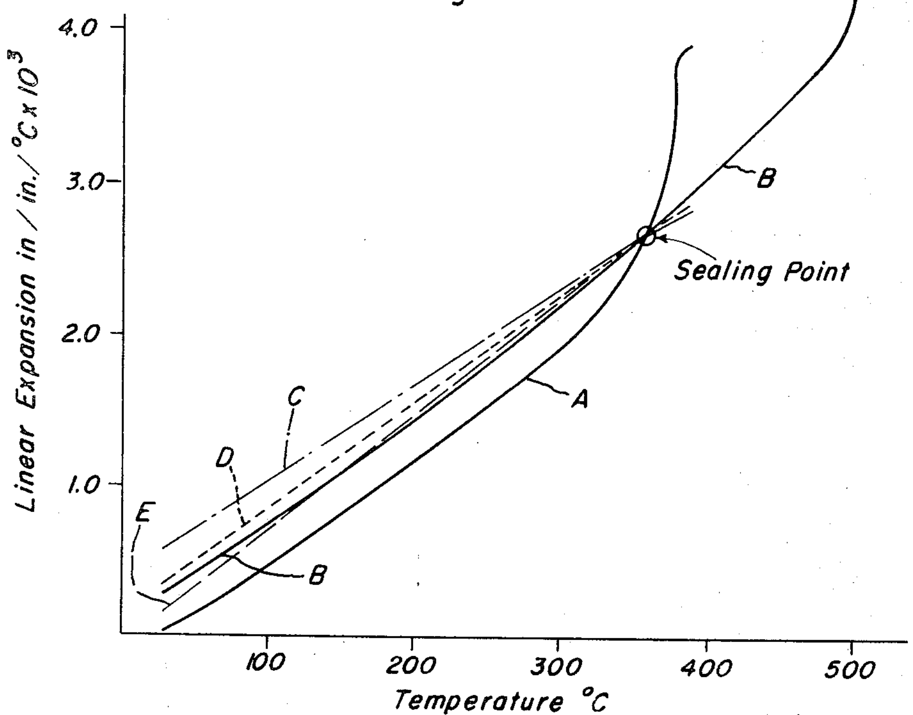

With reference to the drawings accompanying and forming a part of this specification:

FIG. 1 is a transverse sectional view of an image orthicon target assembly embodying this invention in a preferred form;

FIG. 2 is an enlarged fragmentary view of the FIG. 1 assembly showing the relationship between the several parts more clearly; and FIG. 3 is a chart bearing curves illustrating the thermal linear expansion characteristics of three nickel-iron alloys and two glasses over a range of several hundred degrees Centigrade and indicating the sealing point temperature of a preferred sealing glass composition of this invention.

Image orthicon target assembly 10 illustrated in FIG. 1 comprises a semiconducting glass membrane 12, a flanged metal support ring 13 and a sealing glass fillet 14 joining membrane 12 securely to ring 13. Membrane 12 is of a diameter slightly greater than the inside diameter of the support ring flange and the membrane is disposed coaxially of the ring so that the periphery of the membrane overlies the inner annular portion of the ring flange. Sealing glass fillet 14 has a portion disposed between the opposing peripheral portions of membrane 12 and ring 13 and serves to join these two parts together in an integral structure. Additional portions of fillet 14 supplement the joining and supporting function of this sandwiched portion, the fillet being in the form of an annular bead carried on the top of ring 13 and disposed around the edge of membrane 12.

In practice, assembly 10 is preferably made by first coating the flange of ring 13 with a layer of frit of a sealing glass of this invention and fusing the two together. A section of semiconducting glass cut from a bubble as described in the aforesaid U.S. Pat. 3,258,434 is then placed over the fritted ring in contact with the sealing glass. This assembly is fired until the glass membrane has sagged over ring 13 and has subsequently "pulled up" uniformly with the plane of the ring as the drawing indicates. Actually, during the firing operation, the sealing glass frit remelts and wets the membrane and the ring and flows generally into the form illustrated in FIG. 1, and then as the temperature in the oven is gradually reduced, the sealing glass solidifies and the relative contraction between the support ring and target glass on further cooling establishes a biaxial tension in the glass membrane. In other words, the sealing glass of fillet 14 has expansion characteristics complementary to both membrane 12 and ring 13. The excellent wetting of sealing glass to target glass produces a tensile force which accounts for the pulling-up effect produced during the initial stages of cooling assembly 10 during sealing. This sealing glass is additionally particularly suitable for this use because in finished form it has a smooth, glassy coating and does not tend to devitrify and is not adversely chemically reactive with either the glass of membrane 12 or the metal of ring 13.

In FIG. 3, linear expansion is plotted against temperature, and curve A represents the linear expansion characteristics over nearly 400° C. of a preferred sealing glass composition of this invention. Curve D depicts these characteristics of a semiconducting calcium borate disclosed and claimed in U.S. Pat. 3,258,434, and containing 63 mol percent $CaO \cdot 2B_2O_3$, 10 mol percent $Fe_3O_4$, and 27 mol percent $V_2O_5$. Curves C, D and E are, respectively, representative of the thermal linear expansion characteristics of binary, solid-solution, nickel-iron alloys containing 44 percent nickel, 45 percent nickel, and 46 percent nickel, respectively. From FIG. 3, it is apparent that a 44 percent nickel-iron alloy would not be suitable for use with sealing glass of curve A, there being a linear contraction difference between these two elements greater than 0.0005 inch per inch, resulting in a large tensile stress in the sealing glass. On the other hand, the nickel-iron alloys of curves D and E would be suitable for use with this particular sealing glass in accordance with this invention. As is further apparent from FIG. 3, the sealing-point temperature of the curve A glass is relatively low, in the neighborhood of 360° C., which compares favorably with the sealing-point temperature of the semiconducting glass of curve B, which approximates 500° C. In the preferred practice of this invention, this temperature difference should be 120° C. or more with the sealing temperature of the sealing glass being always the lower temperature. Also, it is clear from the chart of FIG. 3 that where it is desirable to obtain a tightly stretched membrane 12 or target glass element or similar glass part in some other application or apparatus, the metal element and glass elements should have the relative expansion characteristics represented by curves A, B and D. Such a selection in an image orthicon target would provide a system in which the supporting ring would contract slightly less than the glass membrane during cooling. In the usual practice of tightening a target glass or membrane of such an assembly, the drawing or tightening of the membrane is achieved in a post-sealing treatment wherein a deposited aluminum film is converted to $Al_2O_3$. This requires that in initial assembled and sealed form the glass membrane must be slack enough that the subsequent treatment does not result in the development of destructive tensile forces in the membrane. It is a feature of this invention that the magnitude of tension or slackness of such a membrane or similar glass part in the sealed assembly may be predicted and controlled to meet such a special requirement.

It is anticipated that to some degree, substitutions may be made for the essential components of the glass compositions of this invention. Thus, the barium oxide may be replaced in part by calcium oxide, strontium oxide or magnesia. Likewise, the zinc oxide may be partially replaced by beryllium oxide or cadmium oxide. These substitutions may be made on the basis that the barium oxide is a glass modifier which depresses both viscosity and devitrification tendencies and lime, magnesia and strontia are known to have similar effects in varying degrees. Likewise, the zinc oxide acts as a glass modifier which enables low thermal expansions in glass compositions, and berryllia and cadmium oxide to some extent exhibit a similar characteristic. The vanadium pentoxide serves to decrease and depress viscosity without significantly increasing thermal expansion, while the boron trioxide acts as a low melting glass former. Substitutions of these additional ingredients with substances known to have these properties, characteristics or effects to a marked degree are therefore also contemplated by this invention and are within the purview of the appended claims.

In making such substitutions, it should be noted that the effectiveness of substituted materials may vary substantially and that, likewise, any adverse or detrimental side effects of such materials will vary somewhat. Thus, for instnace, 40 percent represents the upper limit of vanadium pentoxide in these new sealing glasses because larger amounts make the glasses tend to devitrify at intolerable rates, especially during aluminizing operations. Other viscosity depressants may be used in larger proportion without creating devitrification problems. Still other functional equivalents of vanadium pentoxide may be used only in much smaller proportions because of their influence on devitrification tendencies of the sealing glass or some other deleterious property or characteristic.

Semiconducting glasses contemplated for use as target elements or membranes in accordance with this invention include those disclosed in the aforesaid U.S. Pat. 3,258,-434.

The following illustrative, but not limiting, example is offered as a further detailed disclosure of the best mode of practicing the present invention:

EXAMPLE I

Sealing glass represented by curve A of FIG. 3 is prepared by mixing together and melting at 1050° C. in a platinum curcible 62 grams of reagent grade $B_2O_3$, 58 grams reagent grade $BaCO_3$, 127 grams reagent grade $ZnCO_3$, and 111 grams $V_2O_5$ (purified grade—99.7 percent). This melt is then air-quenched and ground to pass a 250-mesh sieve. Target glass is then prepared by mixing together 2000 grams of reagent grade $CaCO_3$ and glassmakers grade $H_3BO_3$ in a 1-to-4 molar ratio and melting the mixture at 1300° C. for two hours in a platinum crucible. Dry tank $N_2$ is bubbled through the melt during the last 30 minutes to promote drying and the melt is then air-quenched and crushed to pass a 20-mesh sieve. This frit is then mixed with an appropriate amount of $Fe_3O_4$ (purified grade) and $V_2O_5$ (purified grade—99.7 percent) to make a 1500-gram batch, and melted at 1200° C. for three hours in a platinum crucible. This target glass is of the composition represented by curve B, FIG. 3, and thus contains 63 mol percent $CaO \cdot 2B_2O_3$, 27 mol percent $V_2O_5$, and 10 mol percent $Fe_3O_4$. This target glass melt is stirred for 30 minutes during the last hour of its heating period to promote homogeneity and, finally, is air-quenched and crushed to pass a 20-mesh sieve. Using a nickel-iron alloy image orthicon target support ring containing 46 percent nickel, balance iron, the assembly illustrated in FIGS. 1 and 2 is produced by first fritting the top surface of the ring flange with the sealing glass frit prepared as described above. Fritting is accomplished by mixing sealing glass frit with a mixture of amyl acetate and nitrocellulose which serves as an adhesive, holding the frit particles in place on the ring until the frit is melted and develops adherence of its own, flowing around the ring surface as indicated in FIG. 2. Thus, this organic bonding agent after air drying is vaporized in the oven as the ring is baked at 600 to 700° C. Thereafter, the fritted ring is cooled and a spherical segment or bubble fragment of the target glass is disposed over the ring and the assembly is placed in a metal retort which in turn is disposed in an oven for a second firing at an oven temperature of 650 to 700° C. Within three to six minutes at that temperature the target sphere segment sags into position on top of the ring and in contact with the sealing glass coating as shown to best advantage in FIG. 2. The retort is then removed from the oven and the target glass assembly is permitted to cool, and during this time the target glass is pulled up into the plane of the ring due to the differential contraction of the sealing glass, the ring and the target glass so that when the assembly has reached room temperature, the parts are releated as shown in FIGS. 1 and 2.

Wherever in this specification and in the appended claims, percentages, proportions or amounts are recited, the weight basis is referred to unless the contrary is expressly and specifically stated.

Having thus described this invention in such full, clear, concise and exact terms as to enable any person skilled in the art to which it apertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, part of the specifically-described embodiments of the invention may be made without departing from the scope of the invention as set forth in what is claimed.

What we claim as new and desire to secure by Letters Patent of the United States is:

1. An image orthicon target comprising a nickel-iron alloy support ring, a glass membrane disposed over and closing the ring and having a sealing-point temperature approximating 500° C. and a thermal linear expansion approximating that of the said ring over a temperature range of more than 200° C., and a sealing glass disposed between the metal ring and the glass membrane and bonding said ring and membrane together around their peripheries, said sealing glass having a lower softening-point temperature than the glass membrane and a thermal linear expansion within less than 0.0005 inch per inch per degree centigrade than that of the metal ring over a temperature range from room temperature to the softening-point temperature of the sealing glass.

2. An image orthicon target comprising a nickel-iron alloy support ring, a calcium borate-iron oxide-vanadium pentoxide glass membrane disposed over and closing the ring, and a sealing glass disposed between the metal ring and the glass membrane and bonding said ring and membrane together around their peripheries, said sealing glass having a lower softening-point temperature than the glass membrane and consisting essentially of between 10 and 25 parts of barium oxide, between 15 and 30 parts of boron oxide, between 25 and 40 parts of vanadium pentoxide, and between 25 and 40 parts of zinc oxide and having a thermal linear expansion within less than 0.0005 inch per inch per degree centigrade than that of the metal ring over a temperature range of more than 200° C.

References Cited

UNITED STATES PATENTS

| | | | |
|---|---|---|---|
| 2,647,070 | 7/1953 | Litton | 65—43 |
| 2,663,658 | 12/1953 | Schurecht | 106—39 X |
| 2,773,289 | 12/1956 | Martin et al. | 65—59 X |
| 2,814,165 | 11/1957 | Goodwin | 65—43 |
| 3,069,578 | 12/1962 | Hares et al. | 313—89 X |
| 3,167,418 | 1/1965 | Hopkins et al. | 65—43 |
| 3,202,493 | 8/1965 | Heil | 65—43 |
| 3,258,434 | 6/1966 | Mackenzie et al. | 252—519 |

FOREIGN PATENTS

| | | |
|---|---|---|
| 744,947 | 2/1956 | Great Britain. |
| 786,582 | 11/1957 | Great Britain. |

JAMES W. LAWRENCE, Primary Examiner

V. LAFRANCHI, Assistant Examiner

U.S. Cl. X.R.

65—43, 59; 106—47